United States Patent
Sato

(10) Patent No.: US 7,212,718 B2
(45) Date of Patent: May 1, 2007

(54) APPARATUS AND METHOD FOR HEAT-TREATMENT OF OPTICAL FIBER REINFORCING MEMBER AND OPTICAL FIBER FUSION SPLICING APPARATUS

(75) Inventor: Ryuichiro Sato, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 237 days.

(21) Appl. No.: 10/986,158

(22) Filed: Nov. 12, 2004

(65) Prior Publication Data

US 2005/0123253 A1 Jun. 9, 2005

(30) Foreign Application Priority Data

Nov. 12, 2003 (JP) ............................. 2003-381900
Nov. 13, 2003 (JP) ............................. 2003-383623

(51) Int. Cl.
*G02B 6/00* (2006.01)
*H05B 3/58* (2006.01)

(52) U.S. Cl. ..................... 385/134; 385/136; 385/147; 219/520; 219/528; 219/535; 219/538

(58) Field of Classification Search ................ 385/134; 219/535
See application file for complete search history.

(56) References Cited

U.S. PATENT DOCUMENTS

| 4,460,820 | A | * | 7/1984 | Matsumoto et al. | ........ 219/385 |
| 6,023,996 | A | * | 2/2000 | Dodge et al. | ................ 81/9.51 |
| 6,437,299 | B1 | * | 8/2002 | Watanabe et al. | ........... 219/478 |
| 2002/0088796 | A1 | * | 7/2002 | Karacsony et al. | ......... 219/521 |

FOREIGN PATENT DOCUMENTS

| FR | 2488184 A | * | 2/1982 |
| JP | 9-297243 | | 11/1997 |

* cited by examiner

*Primary Examiner*—Frank G. Font
*Assistant Examiner*—Ryan Lepisto
(74) *Attorney, Agent, or Firm*—McDermott Will & Emery LLP

(57) ABSTRACT

A heat-treatment apparatus according to the present invention comprises a sheet-like heating body, which is bent like a letter "U", and a heat equalizing plate constituted by a metal plate bonded to a heat generating part of the sheet-like heating body. The heat equalizing plate is bonded to the inner surface of the sheet-like heating body bent like a letter "U". Alternatively, a fluorocarbon resin is coated on the surface of the heat equalizing plate.

9 Claims, 14 Drawing Sheets

ABSTRACT AND METHOD FOR
HEAT-TREATMENT OF OPTICAL FIBER
REINFORCING MEMBER AND OPTICAL
FIBER FUSION SPLICING APPARATUS

BACKGROUND OF THE INVENTION

1. Field of the Invention

The present invention generally relates to an apparatus and method for heat-treatment of an optical fiber reinforcing member, which reinforces optical fibers by covering a fusion-splicing portion therebetween with a sleeve-like protection member and by heat-shrinking the sleeve-like protection member, and to an optical fiber fusion-splicing apparatus.

2. Description of Related Art

Hitherto, the fusion-splicing of optical fibers has been performed by removing a fiber coating from a connecting end of each of the fibers and by heat-fusing exposed butting end parts of the bare fiber portions. The fusion-spliced bare fiber portions, from each of which the fiber coating is removed, are weak in mechanical strength and thus protected by reinforcing members. These reinforcing members are usually constituted by accommodating a thermal melting tube made of a thermal melting resin, to which a tensile strength member (referred to also as a reinforcing rod) is attached, in a heat shrinkable tube adapted to shrink in a radial direction by being heated (see , for example, JP-A-9-297243 (FIGS. 4 and 6 and the description thereof)).

FIGS. 15A to 15C are views illustrating the conventional method for heat-treatment of a fusion-splicing portion, which is disclosed in the JP-A-297243. More particularly, FIG. 15A is an explanatory view illustrating an example of a general reinforcing member. FIG. 15B is a view illustrating an example of heat-treatment using a V-grooved heater support. Further, FIG. 15C is a view illustrating an example of heat-treatment using a U-grooved heater support.

In an example of single optical fibers shown in FIG. 15A, the fiber coatings of the connecting ends of both optical fibers 1 to be fusion-spliced to each other are removed therefrom to thereby expose bare fiber portions thereof. Then, the leading ends thereof are butted against each other and then fusion-spliced to each other by arc-discharge or the like. The reinforcing member 6 has a length sufficient to cover a predetermined range of each of the fiber coatings left at both sides of the spliced bare fiber portion. The reinforcing member 6 is constituted in such a way as to accommodate a thermal melting tube 4 made of a thermal melting adhesive and also accommodating a crescentic tensile strength member 5 in a heat shrinkable tube 3. The fusion-spliced optical fiber 1 is inserted into the thermal melting tube 4 so that the fusion-spliced portion 2 is positioned at the center thereof. Then, the fusion-spliced optical fiber 1 is heat-treated on a flat heater support 9.

FIGS. 15B and 15C illustrate examples of reinforcement of a fusion-spliced portion of an optical fiber ribbon 1'. In these cases, a reinforcing member 6' is constituted in such a way as to accommodate a thermal melting tube 4 made of a thermal melting adhesive and also accommodating a tensile strength member 5' in a heat shrinkable tube 3, similarly to that shown in FIG. 15A. Further, optical fiber ribbons 1' are disposed on both sides of the tensile strength member 5' to thereby collectively reinforce plural fusion-splicing portions. A heater support 9' shown in FIG. 15B is formed so that surfaces thereof, on which the reinforcing member 6' is accommodated and placed, are constituted by those of a V-shaped cross-sectionally formed V-groove 7. Furthermore, a heater support 9' shown in FIG. 15C is formed so that surfaces thereof, on which the reinforcing member 6' is accommodated and placed, are constituted by those of a U-shaped cross-sectionally formed U-groove 8. Incidentally, the heater support 9' having the V-groove 7 or the U-groove 8 can be used in the case of employing the single optical fiber 1 shown in FIG. 15A.

The reinforcing member 6' is heated by heat transmitted from the concave wall surfaces that are constituted by the V-groove 7 or the U-groove 8. Thus, the heat shrinkable tube 3 heat-shrinks and reduces space-capacity therein. Simultaneously, the thermal melting tube 4 melts, so that the space in the heat shrinkable tube 3 is filled with the molten resin, and that the exposed fusion-spliced portion and peripheral parts thereof are surrounded by the molten resin. Thereafter, the molten thermal melting tube 4 becomes solidified. Thus, the heat shrinkable tube 3, the tensile strength member 5', and the optical fiber ribbons 1', which includes the fusion-spliced potion, are united, so that the reinforcement is completed. It is described that as compared with the case of heating the reinforcing member 6' by using the heater support 9 having a flat heating surface as shown in FIG. 15A, a uniform and efficient heat-treatment can be performed by employing, when heating the reinforcing member 6', the concave wall surfaces constituted by the V-groove 7 or the U-groove 8 as the heating surfaces of the heater support 9'.

However, the reinforcement of fusion-splicing of optical fibers is performed on those of a large variety of optical fibers from the single optical fiber to the optical fiber ribbon. Thus, the diameter of the reinforcing member varies with the optical fibers. For example, in comparison with a case where the diameter of a cross-section of a reinforcing member for the single optical fiber is about 4 mm before shrinkage thereof, that of a cross-section of a reinforcing member for 16-fiber to 24-fiber optical fiber ribbons is 8 mm. Therefore, generally, it is necessary to manufacture and prepare for heaters that are made of a material, such as metal and ceramics, and respectively provided with concave heating portions having various sizes. Thus, this reinforcement has problems with cost and management.

In contrast with this, there has been also known an example of bending a flexible sheet-like heating body like a letter "U" and using the bent heating body as a heater in the heat-treatment of the reinforcing member. The use of this flexible sheet-like heating body enables the heat-treatment to be applied to the reinforcing members respectively having different diameters. Further, the heater has a relatively simple configuration and is useful. However, this sheet-like heating body, which is formed by bonding a heating element to a surface of an organic resin film, is relatively small in heat capacity per unit area. Thus, in a case where a heat generating portion of the sheet-like heating body has a part, which makes contact with the reinforcing member, and another part that does not make contact with the reinforcing member, the temperature of the part making contact with the reinforcing member is made by a heat transfer action to be constant at a relatively low value. Conversely, the part, which does not make contact with the reinforcing member, causes no heat dissipation due to heat transfer. Therefore, there is a fear that the temperature of this part may excess a heat resistant temperature, and that thus, this part may burn out.

DISCLOSURE OF THE INVENTION

Problems to be solved by the invention are to provide an apparatus and method for heat-treatment of an optical fiber reinforcing member using a sheet-like heating body, which is enabled to heat the reinforcing member at uniform temperature by the sheet-like heating body's heat generating part in which temperature variation is small, and to provide an optical fiber fusion-splicing apparatus.

According to the invention, there is provided an optical-fiber-reinforcing-member heat-treating apparatus or method for heat-shrinking an optical fiber reinforcing member, which protects a fusion-splicing portion between optical fibers. According to this apparatus or method, a heating portion is constituted by a sheet-like heating body, which is bent like a letter "U". Further, a heat equalizing plate constituted by a metal plate is bonded to a heating portion of the sheet-like heating body. Preferably, the heat equalizing plate is bonded to the inner surface of the heating body bent like a letter "U". Alternatively, preferably, a fluorocarbon resin is coated on the surface of the heat equalizing plate. Alternatively, the heat equalizing plate may be constituted by plural heat equalizing subplates thermally separated in an axial direction of the reinforcing member.

The heat equalizing plate bonded to the heating portion of the sheet-like heating body reduces the difference in temperature between a contact part of the heating portion, with which the optical fiber reinforcing member makes contact, and a noncontact part thereof, with which the reinforcing-member makes no contact. Further, the heat equalizing plate suppresses the rise of the temperature of the noncontact part. Thus, the sheet-like heating body can be prevented from burning out. Furthermore, in a case where a fluorocarbon resin is coated on the surface of the heat equalizing plate, even when the thermal melting tube melts so that the molten resin adheres onto the heating body, the molten resin can easily be wiped away.

Additionally, according to the optical-fiber-reinforcing-member heat-treating apparatus or method of the invention, the heating temperature of each of side heating parts of a heating portion of the U-shaped sheet-like heating body may be set to be lower than the heating temperature of a central heating part thereof. For example, the power density of each of side heating parts of a heating portion of the U-shaped sheet-like heating body may be set to be equal to or lower than 80% of the power density of a central heating part thereof. Alternatively, preferably, a heating element of the U-shaped sheet-like heating body is zigzag-formed so that a density of a heating element of each of the side heating parts is coarse as compared with a density of a heating element of the central heating part.

The difference in temperature between the contact part and the noncontact part can be decreased by reducing the heating value of the noncontact part of the sheet-like heating body, with which the optical fiber reinforcing member makes no contact. Thus, the rise of the temperature of the noncontact part can be suppressed. Consequently, the temperature of the sheet-like heating body can avoid rising to a temperature that is equal to or higher than a heat resistant temperature.

DETAILED DESCRIPTION OF THE INVENTION

Hereinafter, preferred embodiments of the present invention are described in detail by referring to the accompanying drawings.

Figure 1:
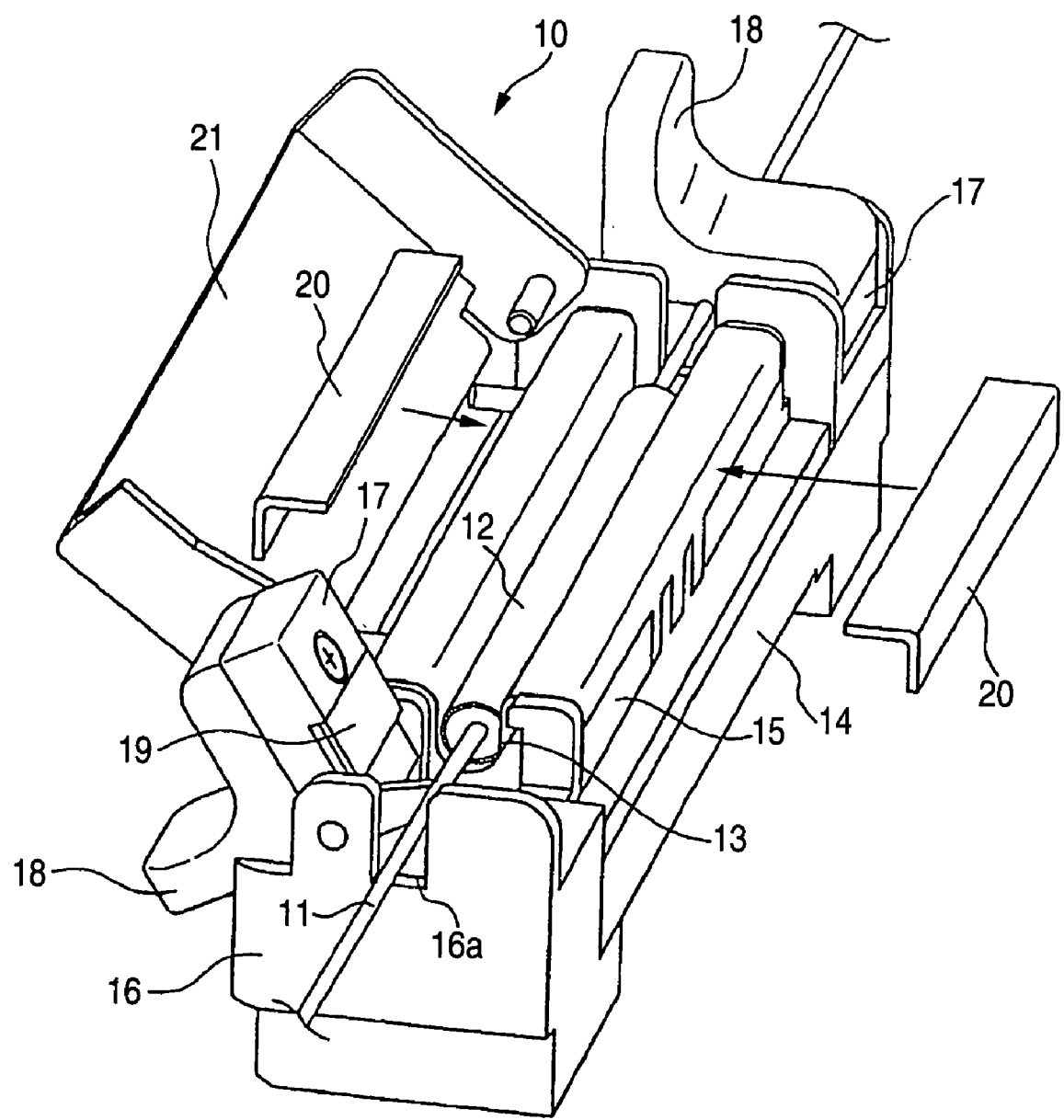
FIG. 1 is a view illustrating a first embodiment of an apparatus for heat-treatment of an optical fiber reinforcing member according to the invention.
Figure 2:
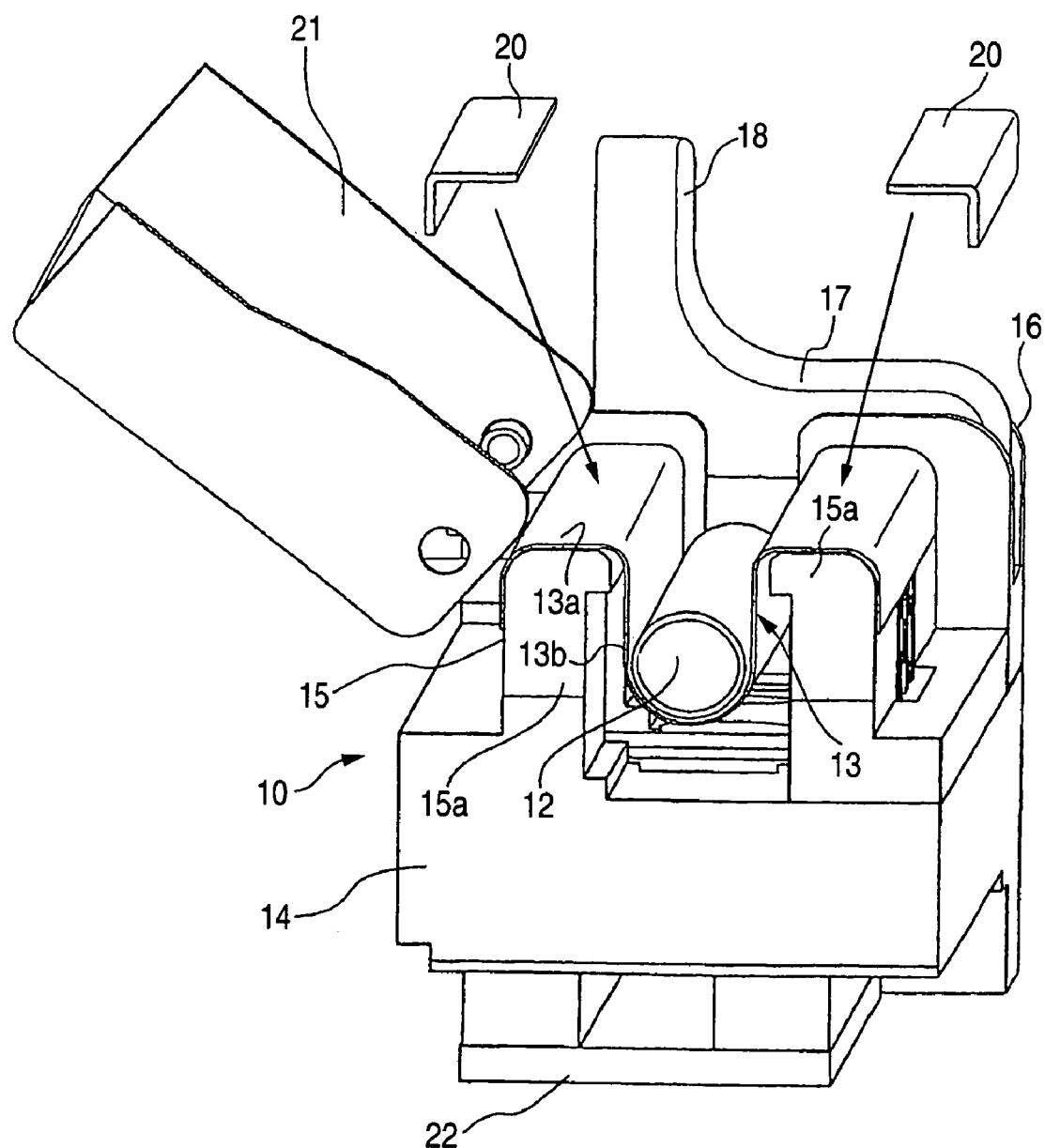
FIG. 2 is a view illustrating a cross-sectional structure of the apparatus for heat-treatment, from which a part thereof shown in FIG. 1 is removed.

FIG. 1 is a view illustrating a first embodiment of an apparatus for heat-treatment of an optical fiber reinforcing member according to the invention. FIG. 2 is a view illustrating a cross-sectional structure of the apparatus for heat-treatment, from which a part thereof shown in FIG. 1 is removed.

Figure 15A:
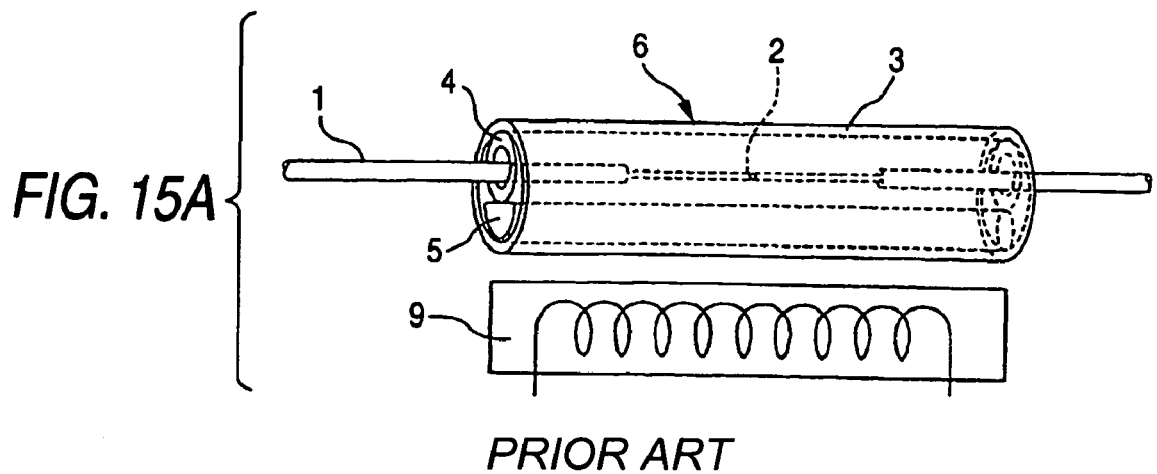
FIGS. 15A to 15C are explanatory views illustrating a conventional method for heat-treatment of an optical fiber reinforcing member.
Figure 15B:
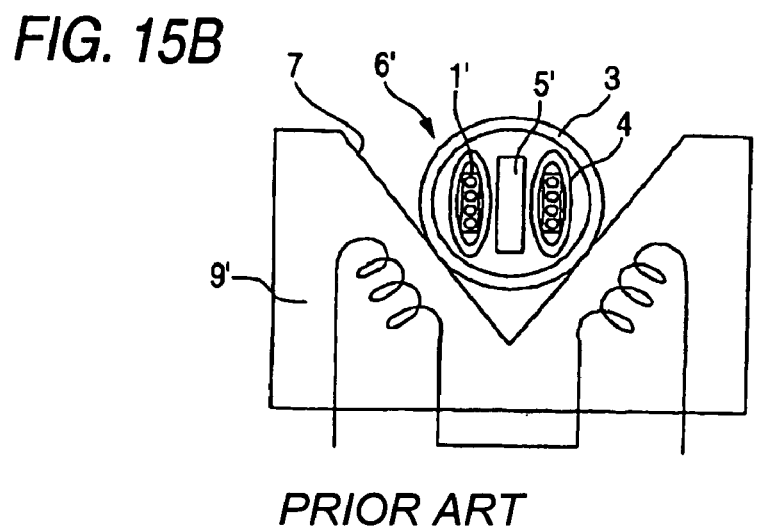
Figure 15C:
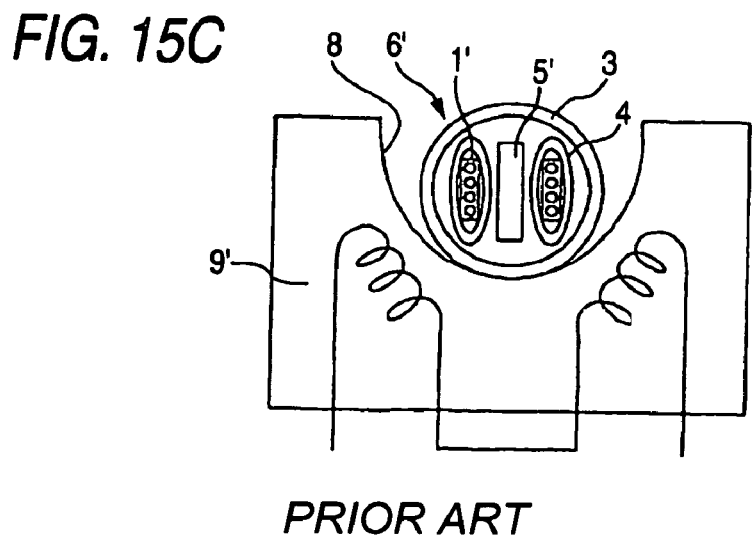

A heat-treatment apparatus 10 according to the first embodiment of the invention accommodates and supports a sheet-like heating body 13 for heating a reinforcing member 12 disposed in such a way as to protect fusion-spliced portion of single optical fibers or optical fiber ribbons 11 and the vicinity thereof. The reinforcing member 12 is constituted in such a manner as to accommodate a thermal melting tube, which is made of a hot melt adhesive resin, and a tensile strength member (referred to also as a reinforcing rod), which is made of a material, such as stainless steel, glass or ceramics, in a heat shrinkable tube, similarly to that shown in FIG. 15A. The sheet-like heating body 13 constituted by bonding a heating element to a heat-resisting polyimide film (for example, attaching a resistance wire thereto) in such a way as to have bendable flexibility is used, though the details thereof will be described later.

A body portion of the heat-treatment apparatus 10 has a heating body supporting portion 15 for supporting the sheet-like heating body 13 provided on a base portion 14. The body portion also has clamp supports 16 for grasping the optical fiber 11, which are provided on both sides of the base portion 14. The heating body supporting portion 15 comprises a pair of supporting frames 15a extending parallel to each other (see FIG. 2). Nonheating portions 13a of both sides of the sheet-like heating body 13 bent like a letter "U" are put on these supporting frames, respectively. The nonheating portions 13a are pressed by cross-sectionally L-shaped pressure members 20 from above to thereby attaching the sheet-like heating body 13 thereto. A heating portion 13b of the sheet-like heating body 13, which is bent like a letter "U", is positioned between the pair of the supporting frames 15a. The reinforcing member 12 is accommodated and placed in the U-shaped portion. The optical fibers 11 extending from both ends of the reinforcing member 12 are drawn out of a groove portion 16a of the clamp support 16.

A clamp piece 17 is turnably provided on the clamp support 16 and operated by grabbing a lug portion 18. A grasping pad 19 using an elastic element, by which the optical fiber 11 can surely be grasped and is not damaged, is provided at a portion for grasping the optical fiber 11. Further, the clamp piece 17 may be configured to adsorb the optical fiber by using a magnet to thereby fix the optical fiber. Preferably, when the clamp piece 17 is closed, the optical fiber 11 is grasped so that the optical fiber 11 including the fusion-splicing portion nearly linearly extends. In this case, the diameter of the reinforcing member 12 varies with the number of fibers. However, the support height of the reinforcing member 12 can be adjusted by adjusting the pressing position on the heating body supporting portion 15. Further, the apparatus may be provided with an additional component (not shown) for applying a constant tensile forth to the optical fiber 11 until the support for the optical fiber 11 is fixed by closing the clamp piece 17.

A cover 21 is openably and closeably provided on the top surface of the base portion 14 thereby to prevent the heating portion from being touched during a heat-treatment, and to prevent a heating condition from being affected in an ambient air. Further, this cover 21 is formed of a transparent resin. Thus, the shrinking condition of the heat shrinkable tube of the reinforcing member 12 and the molten condition of the thermal melting tube can be monitored. A space is provided under the bottom surface of the base portion 14. A control circuit board 22 or the like is mounted thereon.

Figure 3A:
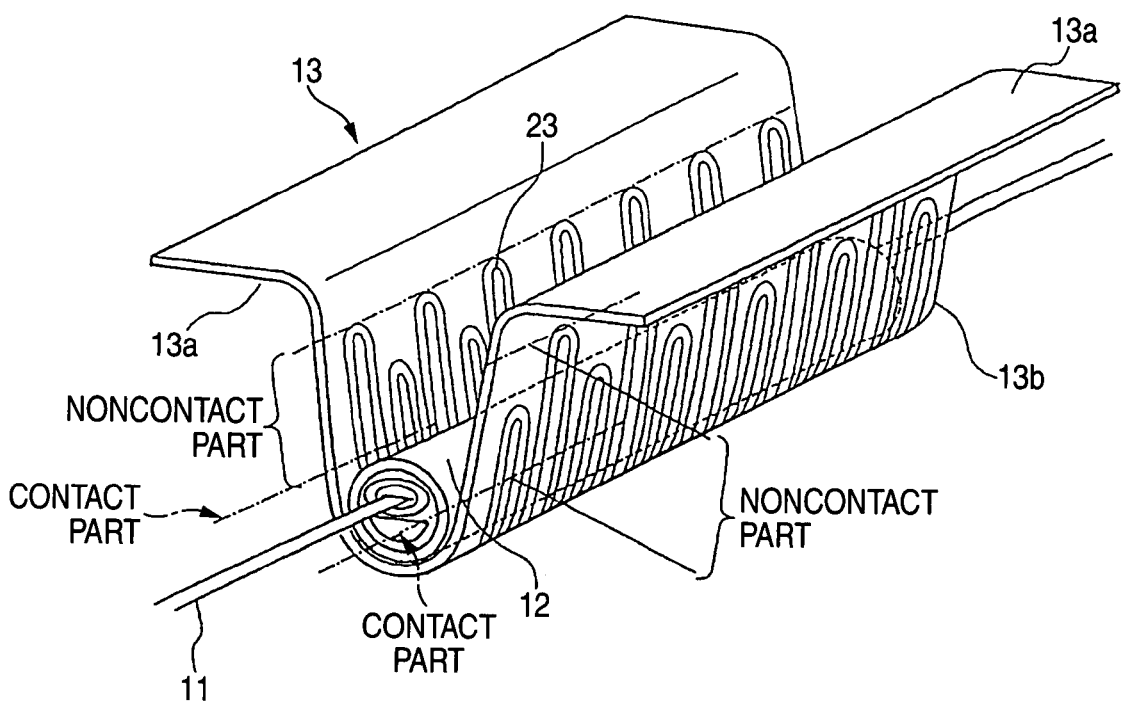
FIGS. 3A and 3B are explanatory views illustrating an outline of a method for heating the reinforcing member according to the invention.
Figure 3B:
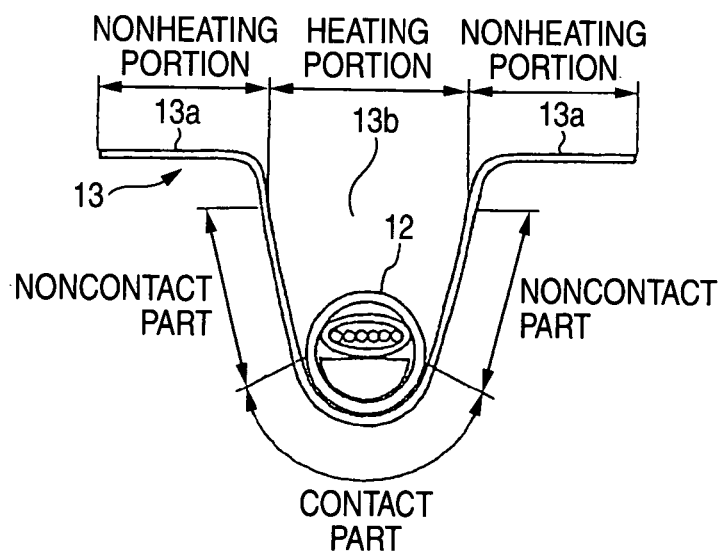
Figure 4A:
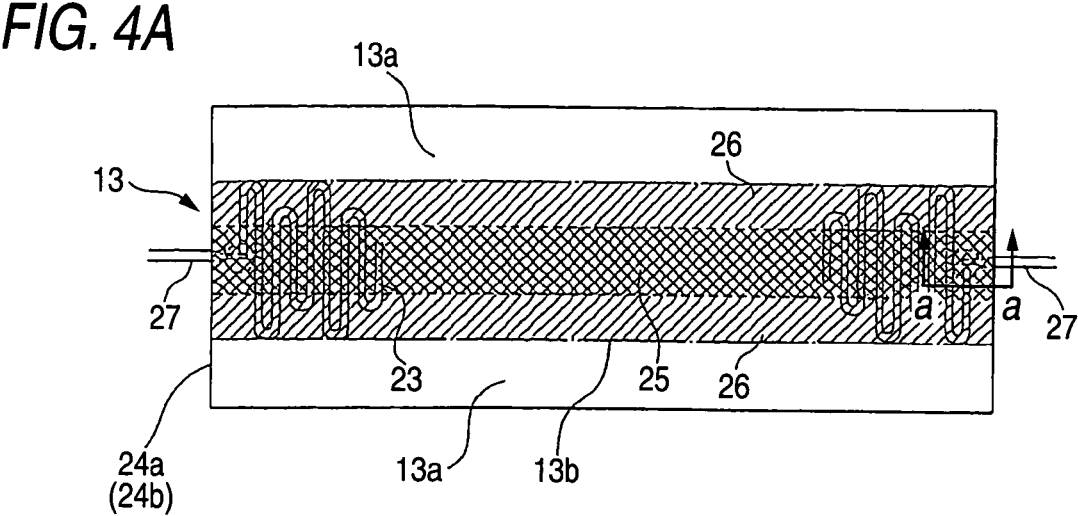
FIGS. 4A to 4C are views illustrating a concrete example of a sheet-like heating body according to the invention.
Figure 4B:
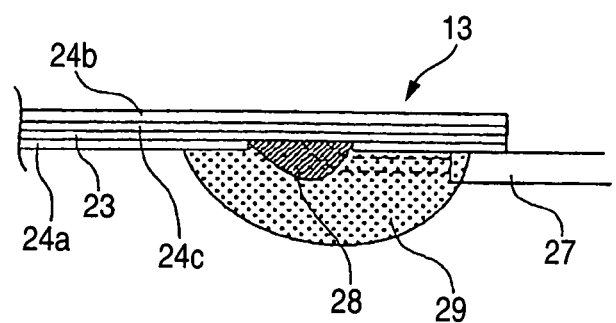
Figure 4C:
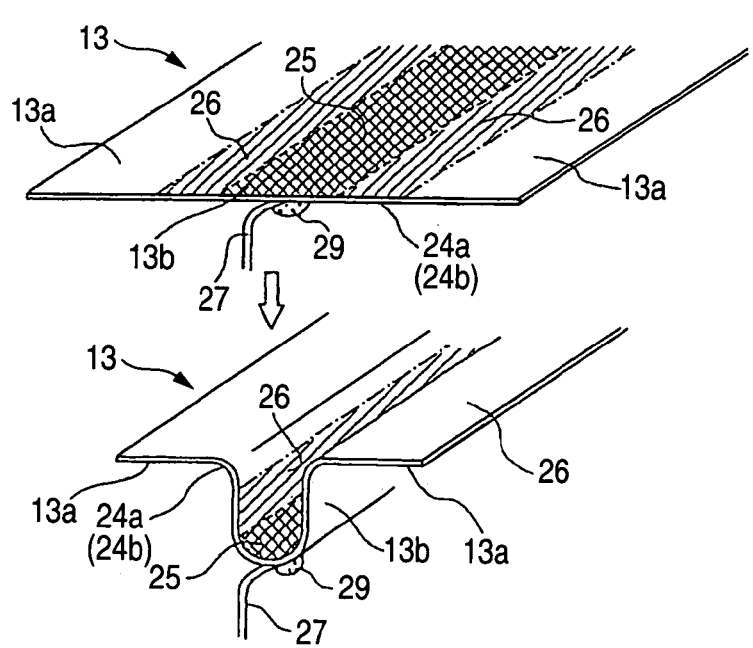

FIGS. 3A and 3B are explanatory views illustrating an outline of a method for heating the reinforcing member according to the invention. FIGS. 4A to 4C are views illustrating a concrete example of the sheet-like heating body according to the invention. FIG. 4A is a plan view illustrating the sheet-like heating body, which is not bent. FIG. 4B is a cross-sectional view illustrating a part of the sheet-like heating body, which is taken along line a—a. FIG. 4C is an explanatory view illustrating a condition in which the sheet-like heating body is bent like a letter "U".

The description of other reference characters is omitted herein by using the same characters as used in FIGS. 1 and 2.

As illustrated in FIG. 3A, the sheet-like heating body 13 is bent so that a cross-section thereof in a direction orthogonal to the axial direction of the reinforcing member 12 is shaped like a letter "U". Further, as illustrated in FIGS. 1 and 2, the nonheating portions 13a provided both sides of the heating body are fixed by the heating body supporting portion and the pressure members in such a way as to maintain a U-shape condition. All the fusion-spliced optical fibers 11 and the reinforcing member 12 are accommodated and placed in the U-shaped central heating portion 13b. At that time, although the reinforcing member 12 touches the U-shaped bent bottom portion, side parts are put into a noncontact condition. Incidentally, in an initial stage in which the reinforcing member 12 does not heat-shrink yet, the contact area of the noncontact part is relatively large. When the heating makes progress, so that the outside diameter of the reinforcing member 12 decreases, the area of the contact part decreases, while the area of each of the noncontact parts increases.

According to the invention, the heating portion 13b formed by bonding a heating element 23, such as a resistance wire, thereto is divided into a central heating part 25, which includes the U-shaped bent bottom portion, and side heating parts 26 provided on both sides thereof. The central heating part 25 is set to be a region that covers almost the entire contact part, while the side heating parts 25 are regions that cover almost the entire noncontact parts. Further, as shown in the figure, for instance, the heating element 23 is zigzag-formed so that the density of the heating element 23 of each of the side heating parts is coarse, as compared with that of the heating element in the central heating part. Thus, the temperature of each of the side heating parts is lower than that of the central heating part. Incidentally, the boundary between the contact part and each of the noncontact parts changes, as the heat-treatment of the reinforcing member 12 makes progress. However, it is unnecessary that the boundary therebetween is clearly determined.

In the aforementioned configuration, the reinforcing member 12 touches the U-shaped bent bottom portion. Thus, the reinforcing member 12 is heated by the contact part of this central heating part through heat conduction, and by the noncontact parts of the side heating parts through heat radiation. By this heating, the heat shrinkable tube is heat-shrinked to thereby reduce internal space capacity of the tube. Further, the thermal melting tube is molten, so that the reduced space capacity can be filled with the molten resin.

During this heating, an amount of heat radiated from the noncontact parts of the sheet-like heating body 13 is fairly small, as compared with an amount of heat radiated from the contact part. Thus, the temperature is liable to rise. However, as described above, side heating parts associated with the side noncontact parts suppress the rise of temperature by reducing an amount of generated heat. Conversely, the amount of heat generated by the central heating part is larger than that of heat generated by each of the side heating parts. However, the rise of temperature is suppressed so as to efficiently transfer heat to the reinforcing member 12. Therefore, the difference in temperature between the contact part and each of the noncontact parts can be reduced. Consequently, the temperature of the entire heating portion 13b can be uniformized to thereby prevent the sheet-like heating body 13 from being damaged.

However, it is now assumed that the heating element 23 is formed at a uniform density in the side heating parts and the central heating part of the heating portion 13b, and that thus the heating temperature becomes uniform. In this case, in the contact part between the heating portion and the reinforcing member 12, heat conducted from the heating portion 13b through heat conduction is dissipated to the reinforcing member 12, while heat dissipated from the noncontact parts is only heat due to the heat radiation, which is fairly small as compared with heat dissipated due to heat conduction. This causes a large difference in temperature between the contact parts and each of the noncontact parts of the reinforcing member 12. There is possibility of occurrence of a phenomenon in which the temperature of the sheet-like heating body 13 is raised to a value, which is equal to or higher than that of a heat resistance temperature. There is a fear that the sheet-like heating body 13 sometimes burns out. Incidentally, in a case where the rise of temperature of the noncontact part is set for safety to be small, the heating temperature of the entire heating body should be set to be low. Thus, a heat-treatment time, during which a heat-treatment is performed on the reinforcing member 12, increases, so that the productivity of the apparatus is degraded.

Next, a concrete example of the aforementioned sheet-like heating body 13 is described hereinbelow with reference to FIGS. 4A to 4C. As shown in FIG. 4A, the sheet-like heating body 13, which is not bent and in a flat condition, has a heating portion 13b, which generates heat by using the heating element 23, in a central main region and also has nonheating portions 13a provided on both sides thereof. The sheet-like heating body 13 is formed like a rectangle, whose transversal width thereof in the flat condition is about 36 mm and the axial width is about 70 mm, so that the transverse width of the heating portion 13b is about 20 mm. The heating portion 13b can be formed by being provided with the heating element 23, which is formed by cutting a stainless steel thin plate having a thickness of about 30 µm in a zigzag manner. This heating element 23 is formed, for instance, in a pattern shape, in which both side parts thereof has a coarse density so that an amount of heat generated by each of the side heating parts 26 is low, as compared with an amount of heat generated by the central heating part 25.

As shown in FIG. 4B, the heating element 23 is stacked on an insulating film 24a employing a heat-resisting polyimide film having a thickness of about 31 µm as a base member. Then, an insulating film 24b, which is about 26 µm in thickness and has a silicon-based adhesive layer 24c, is stacked on this element as a cover member and caused to integrally adheres thereto thereby form an electrically insulated flexible heating body 13. Further, a lead terminal 27 for supplying electric power to the heating element 23 is connected thereto by soldering 28. This connecting portion is protected by a heat-resistant sealing resin 29.

As shown in FIG. 4C, in the sheet-like heating body 13, a central heating part 25, which generates a large amount of heat, is bent in such a way as to become a U-shaped bottom portion. Further, as described by referring to FIG. 3A, both side nonheating portions 13a are held by the heating body supporting portion, and the sheet-like heating body 13 is formed into a shape in which the reinforcing member is accommodated and placed in such a way as to be enclosed in the central U-shaped heating portion 13b. The terminal 27 for supplying heating power to the heating element 23 is connected to a circuit board 22 shown in FIG. 2 and heat-controlled. Furthermore, a temperature detecting element (not shown), such as a thermistor, is provided close to the heating element 23 to thereby perform automatic control of the heating temperature.

Figure 5A:
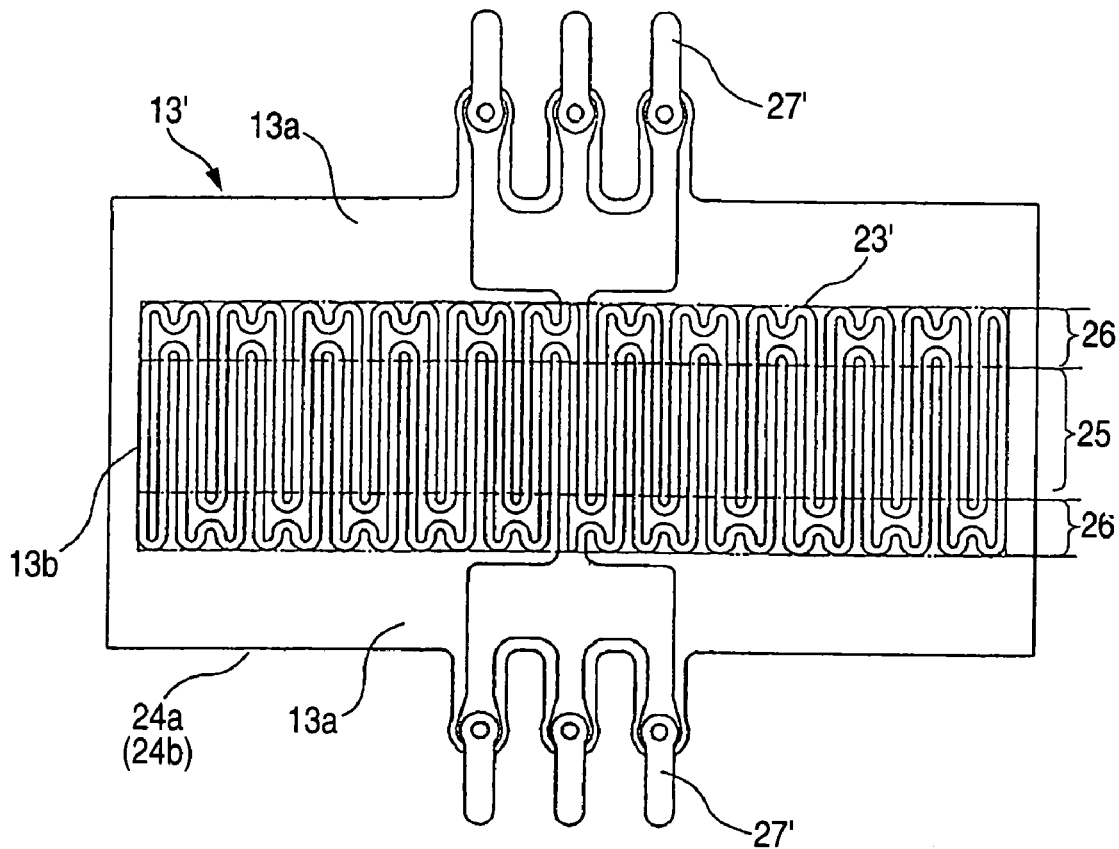
FIGS. 5A and 5B are views illustrating another concrete example of the sheet-like heating body according to the invention.

FIG. 5A is a view illustrating another concrete example of the sheet-like heating body. Further, as compared with the example shown in FIG. 4A, this sheet-like heating body 13' is formed in such a way as to differ therefrom in the pattern shape of the heating element and in the drawing direction and the shape of the lead terminal. Similarly to the example shown in FIG. 4A, the sheet-like heating body 13', which is not bent and in a flat condition, has a heating portion 13b, which generates heat by using the heating element 23 disposed in a central main region and also has nonheating portions 13a provided on both sides thereof. Further, this heating element 23' is formed, for instance, in a pattern shape, in which both side parts thereof has a coarse density so that an amount of heat generated by each of the side heating parts 26 is low, as compared with an amount of heat generated by the central heating part 25.

Figure 5B:
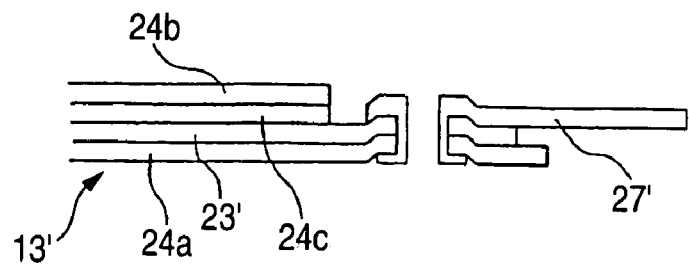

The sheet-like heating body 13' is formed like a rectangle, whose transversal width thereof in the flat condition is about 36 mm and the axial width is about 70 mm, so that the transverse width of the heating portion 13b is about 20 mm, similarly to the example shown in FIG. 4A. The heating portion 13b can be formed by being provided with the heating element 23', which is formed by cutting a stainless steel thin plate having a thickness of about 30 µm in a zigzag manner, as shown in the figure. In the heating portion 13b, the heating element 23' is disposed, for instance, in a pattern shape, in which both side parts thereof has a coarse density so that an amount of heat generated by each of the side heating parts 26 is low, as compared with an amount of heat generated by the central heating part 25. Further, as shown in FIG. 5B, the heating element 23' is stacked on an insulating film 24a employing a heat-resisting polyimide film. Then, an insulating film 24b having a silicon-based adhesive layer 24c is stacked on this element and caused to integrally adheres thereto thereby form an electrically insulated flexible heating body 13'. Further, a lead terminal 27' maybe formed of plural parallel terminals so as to increase the terminal capacity thereof, as illustrated in the figure. Alternatively, the lead terminal 27' may be formed by a mechanical eyelet connection without using solder.

In the heating element 23' having the aforementioned pattern shape, for example, the transversal width of the central heating part 25 is set at 9 mm. The width of the heating element thereof is set at 0.77 mm. The transverse width of each of the side heating parts 26 is set at 5.5 mm. The width of the heating element thereof is set at 0.87 mm. In a case where the power density of the central heating part 25 is 1.7 W/cm$^2$, that of each of the side heating parts 26 can be set at 1.36 W/cm$^2$ by using the heating element 23' having such a shape. Incidentally, although it is unnecessary to clearly determine the border between the central heating part 25 and each of the side heating parts 26, the transversal width of the central heating part 25 is set at about 2, and that of each of the side heating parts 26 is set at about 1. Further, preferably, the power density of each of the side heating parts 26 is equal to or less than 80% of the power density of the central heating part.

Incidentally, the thermal melting tube made of a hot-melt adhesive resin may be molten by heating the reinforcing member 12, and the molten resin may hang down and drop externally. In this case, it may take effort to remove adhesives, which adhere to the surface of the sheet-like heating body 13. Thus, according to the invention, a fluorocarbon resin may be coated on the surface of the sheet-like heating body 13. For instance, even when a molten adhesive adheres thereto, the adhesive can easily be removed therefrom by preliminarily applying a fluorocarbon resin coat thereon. Thus, workability can be enhanced.

Next, a second embodiment of the invention is described hereinbelow by referring to the drawings.

Figure 6:
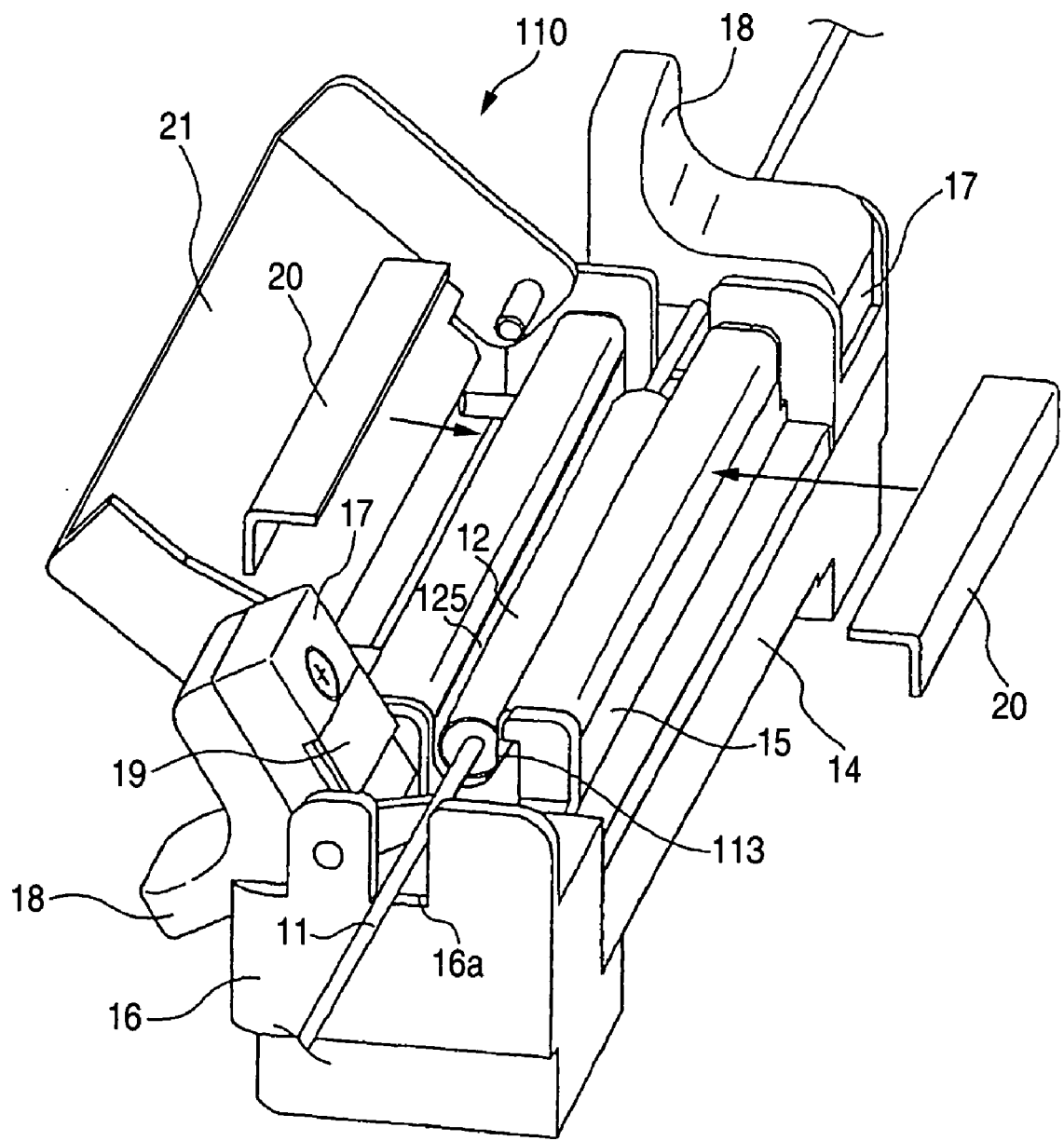
FIG. 6 is a view illustrating a second embodiment of the apparatus for heat-treatment of an optical fiber reinforcing member according to the invention.
Figure 7:
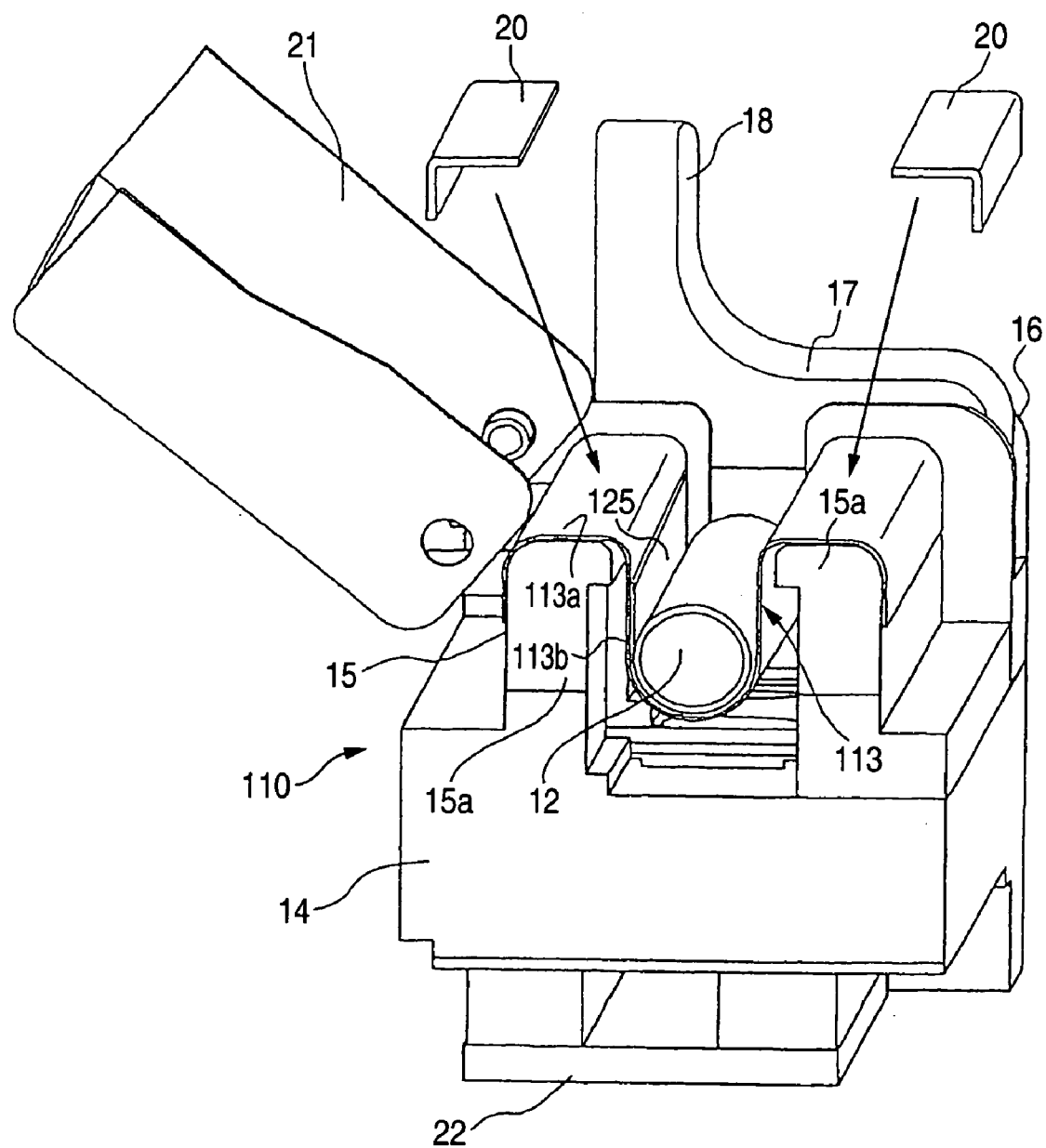
FIG. 7 is a view illustrating a cross-sectional structure of the apparatus for heat-treatment, from which a part thereof shown in FIG. 6 is removed.

FIG. 6 is a view illustrating the second embodiment of an apparatus for heat-treatment of an optical fiber reinforcing member according to the invention. FIG. 7 is a view illustrating a cross-sectional structure of the apparatus for heat-treatment, from which a part thereof shown in FIG. 6 is removed.

As shown in FIGS. 6 and 7, a heat-treatment apparatus 110 according to the second embodiment of the invention has a sheet-like heating body 113, which has nonheating parts 113a and a heating part 113b, a base portion 14, a heating body supporting portion 15, which has supporting frames 15a, a clamp support 16, which has a groove portion 16a, a clamp piece 17, a lug portion 18, a grasping pad 19, pressure members 20, a cover 21, a circuit board 22, and a heat equalizing plate 125. Incidentally, members, which are the same as those of the heat-treatment apparatus 10 of the first embodiment of the invention, are designated by the same reference characters as used for designating those of the first embodiment. Thus, the description of such members is omitted herein.

Figure 8A:
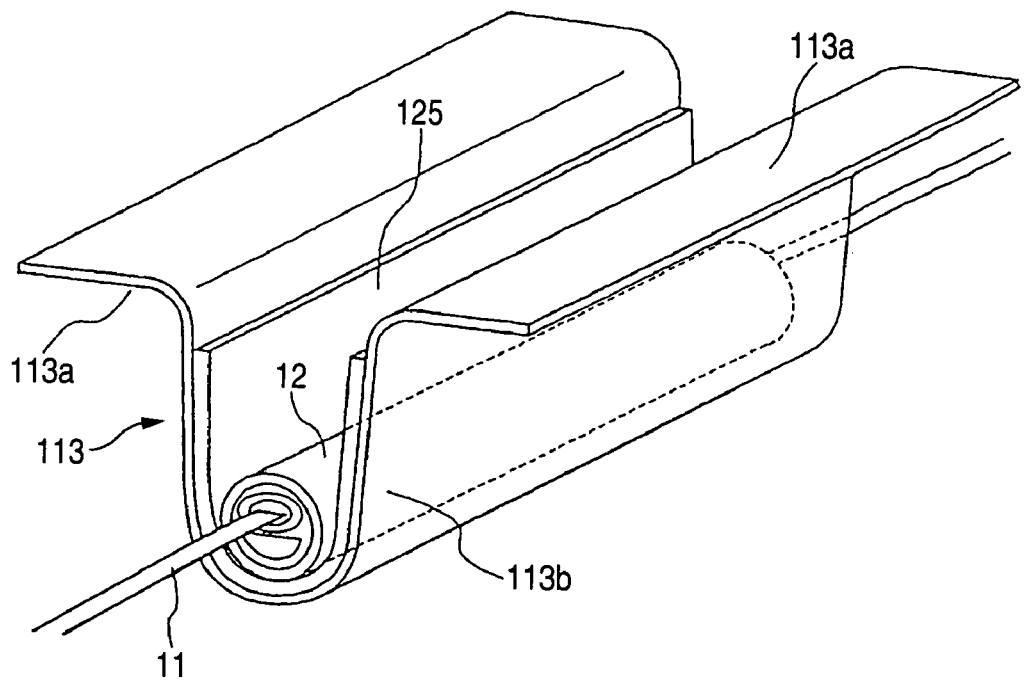
FIGS. 8A and 8B are explanatory views illustrating an outline of a method for heating the reinforcing member according to the invention.
Figure 8B:
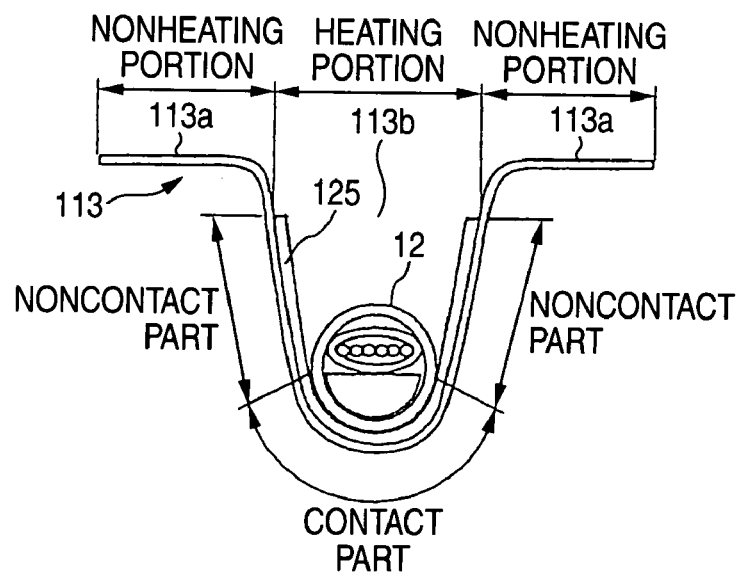
Figure 9A:
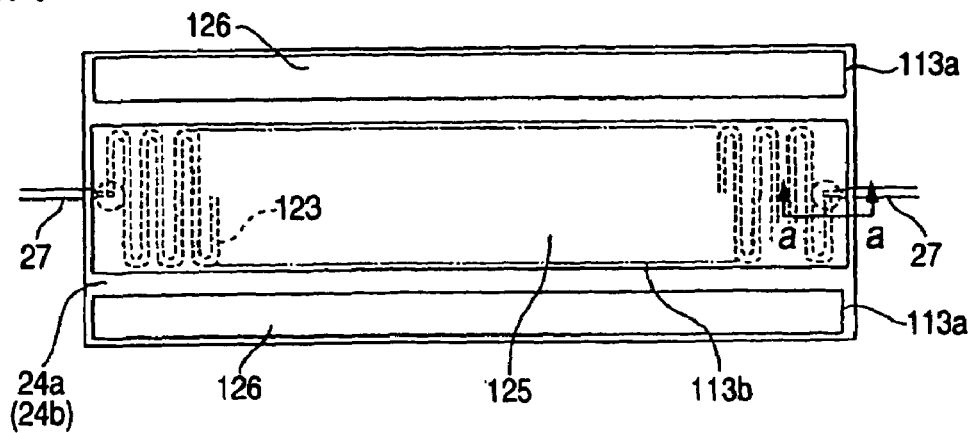
FIGS. 9A to 9C are views illustrating a concrete example of a sheet-like heating body according to the invention.
Figure 9B:
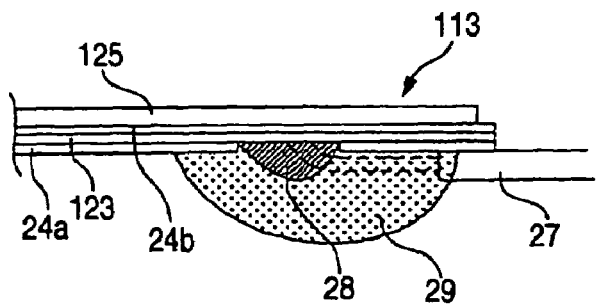
Figure 9C:
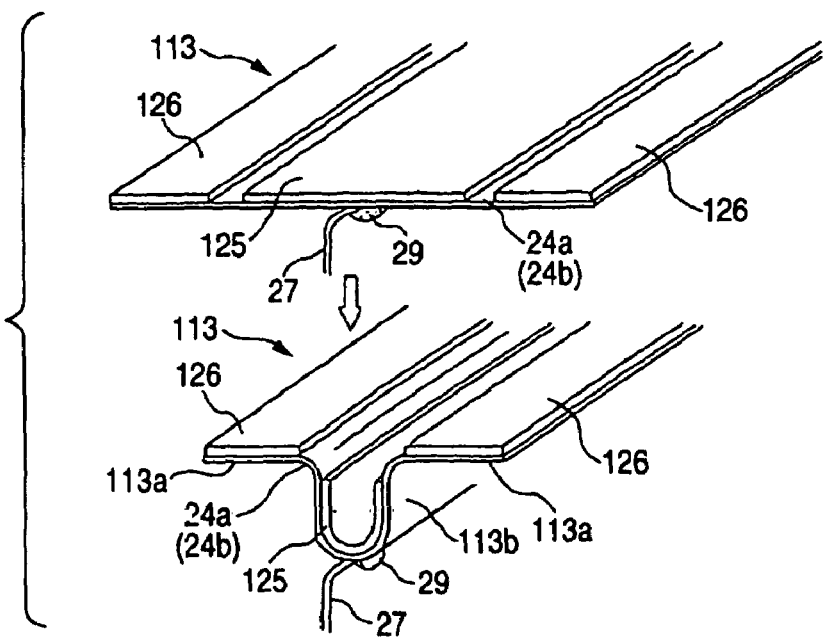

FIGS. 8A and 8B are explanatory views illustrating an outlines of a method for heating the reinforcing member according to the invention. FIGS. 9A to 9C are views illustrating a concrete example of the sheet-like heating body according to the invention. FIG. 9A is a plan view illustrating the sheet-like heating body, which is not bent. FIG. 9B is a cross-sectional view illustrating a part of the sheet-like heating body, which is taken along line a—a. FIG. 9C is an explanatory view illustrating a condition in which the sheet-like heating body is bent like a letter "U".

The description of other reference characters is omitted herein by using the same characters as used in FIGS. 6 and 7.

As shown in FIG. 8A, the sheet-like heating body 113 is bent so that a cross-section thereof in a direction orthogonal to the axial direction of the reinforcing member 12 is shaped like a letter "U". Further, as illustrated in FIGS. 6 and 7, the nonheating portions 113a provided both sides of the heating body are fixed by the heating body supporting portion and the pressure members in such a way as to maintain a U-shape condition. All the fusion-spliced optical fibers 11 and the reinforcing member 12 are accommodated and placed in the U-shaped central heating portion 113b. At that time, although the reinforcing member 12 touches the U-shaped bent bottom portion, side parts are put into a noncontact condition. Incidentally, in an initial stage in which the reinforcing member 12 does not heat-shrink yet, the contact area of the noncontact part is relatively large. When the heating makes progress, so that the outside diameter of the reinforcing member 12 decreases, the area of the contact part decreases, while the area of each of the noncontact parts increases.

In the second embodiment of the invention, a heat equalizing plate 125 constituted by a flexible metal plate made of a metal, such as aluminum or copper, having a good thermal conductivity is bonded to the sheet-like heating body 113 by adhesive bonding. Preferably, the heat equalizing plate 125 is provided on the inner surface of the sheet-like heating body 113, which is bent like a letter "U". The reinforcing member 12 is accommodated and placed therein in such a way as to be directly in contact with the heat equalizing plate 125. The reinforcing member 12 is heated by the bottom portion of the U-shaped body through the heat equalizing plate 125 by heat conduction, and also heated by the side portions thereof by heat radiation. By this heating, the heat shrinkable tube is heat-shrinked to thereby reduce internal space capacity of the tube. Further, the thermal melting tube is molten, so that the reduced space capacity can be filled with the molten resin.

Incidentally, in the case of the configuration, which does not have the heat equalizing plate 125, in the contact part between the heating portion and the reinforcing member 12, heat conducted from the heating portion 113b through heat conduction is dissipated to the reinforcing member 12, while heat dissipated from the noncontact parts is only heat due to the heat radiation, which is fairly small as compared with heat dissipated due to heat conduction. This causes a difference in temperature between the contact parts and each of the noncontact parts of the reinforcing member 12. There is possibility of occurrence of a phenomenon in which the temperature of the sheet-like heating body 13 is raised to a value, which is equal to or higher than that of a heat resistance temperature. There is a fear that the sheet-like heating body 13 sometimes burns out.

However, the heat-treatment apparatus of the invention can reduce the difference in temperature between the contact part and each of the noncontact parts of the reinforcing members 12 by being provided with the heat equalizing plate 125. Consequently, temperature can be uniformed over the entire heating portion 113b, so that the sheet-like heating body 113 can be prevented from being damaged.

Further, the thermal melting tube made of a hot-melt adhesive resin may be molten by heating the reinforcing member 12, and the molten resin may hang down and drop externally. In this case, it may take effort to remove adhesives, which adhere to the surface of the sheet-like heating body 113. Thus, according to the invention, a fluorocarbon resin may be coated on the surface of the heat equalizing plate 125. For instance, even when a molten adhesive adheres thereto, the adhesive can easily be removed therefrom by preliminarily applying a fluorocarbon resin coat thereon. Thus, workability can be improved.

A concrete example of the sheet-like heating body 113 is described hereinbelow with reference to FIGS. 9A to 9C. As shown in FIG. 9A, the sheet-like heating body 113, which is not bent and in a flat condition, has a heating portion 113b, which generates heat by using the heating element 123, in a central main region and also has nonheating portions 113a provided on both sides thereof. The sheet-like heating body 113 is formed like a rectangle, whose transversal width thereof in the flat condition is about 36 mm and the axial width is about 70 mm, so that the transverse width of the heating portion 113b is about 20 mm. The heating element 123 is formed by cutting a stainless steel thin plate having a thickness of about 32 µm in a zigzag manner. This heating element 123 is sandwiched by insulating films 24a and 24b constituted by heat-resistant polyimide films each having a thickness of about 25 µm. Thus, a flexible sheet-like heating body is produced. Further, as shown in FIG. 9B, lead terminals 27 are connected to both ends of the heating element 123 by solder 28, respectively. This connecting portion is protected by a heat-resistant sealing resin 29.

For instance, an aluminum plate having a thickness of about 0.2 mm is bonded to the sheet-like heating body 113 as the heat equalizing plate 125 in such a way as to cover the entire heating portion 113b, in which the heating element 123 exists. Incidentally, although the heat equalizing plate 125 may be bonded to each of both sides of the insulating films 24a and 24b, the heat equalizing plate 125 may be bonded to only one of both sides of each of the insulating films 24a and 24b. However, in the case of providing the heat equalizing plate 125 on only one of the sides thereof, preferably, the heat equalizing plate 125 is bonded to the inner surface of the sheet-like heating body 113, which is bent like a letter "U". Further, auxiliary plates 126 may be bonded to the nonheating portions 113a provided at both sides of the sheet-like heating body 113 so as to facilitate the installation thereof in the heating body supporting portion and the handling thereof. The auxiliary plates 126 are independent of the heat equalizing plate 125 and may be bonded to both sides of the insulating films 24a and 24b. However, the auxiliary plate 126 may be bonded to only one side of each of the insulating films 24a and 24b. Further, each of the auxiliary plates 126 may be constituted by the same metal plate as that constituting the heat equalizing plate 125.

As shown in FIG. 9C, the sheet-like heating body 113 having been shaped like a plate is bent like a letter "U". Further, as illustrated by referring to FIG. 8A, both side nonheating portions 113a are held by the heating body supporting portion, and the sheet-like heating body 113 is formed into a shape in which the reinforcing member is accommodated and placed in such a way as to be enclosed in the central U-shaped heating portion 113b. The terminal 27 for supplying heating power to the heating element 123 is connected to a circuit board 22 shown in FIG. 7 and heat-controlled. Furthermore, a temperature detecting element (not shown), such as a thermistor, is provided close to the heating element 123 to thereby perform automatic control of the heating temperature.

Figure 10A:
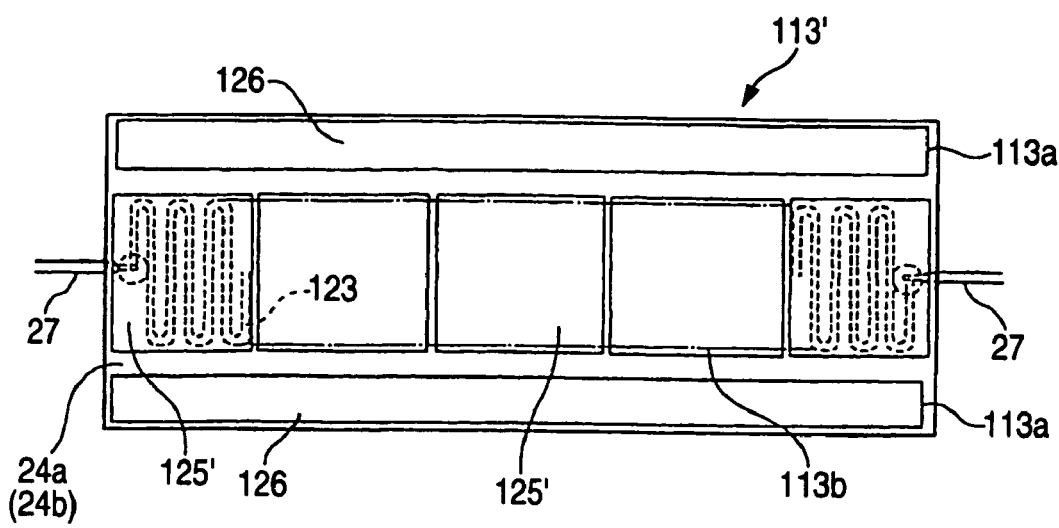
FIGS. 10A and 10B are views illustrating another concrete example of the sheet-like heating body according to the invention.
Figure 10B:
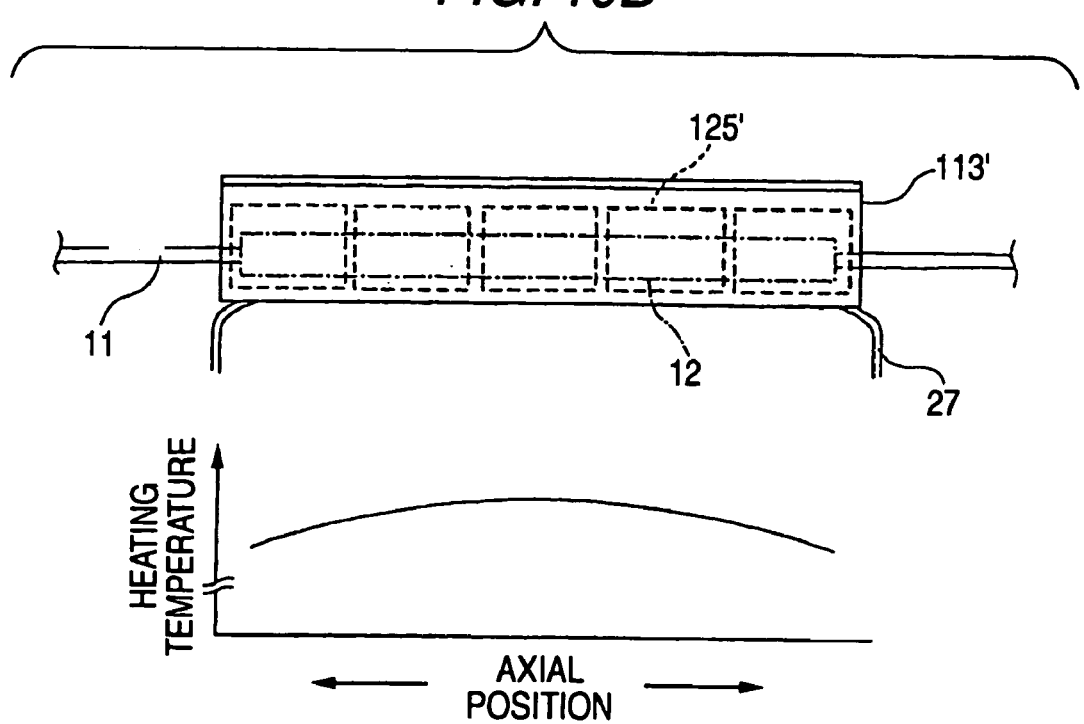

FIGS. 10A and 10B are views illustrating another concrete example of the sheet-like heating body. This sheet-like heating body 113' is an example of using the heat equalizing plate 125' axially divided into plural subplates and thermally separated from one another, in contrast with the example shown in FIG. 9A, which uses a single heat equalizing plate 125 covering the entire heating portion 113b. As illustrated in FIG. 8A, the contact part and the noncontact parts of the reinforcing member 12 of the heating portion 113b are provided in the direction of a side surface orthogonal to the axial direction of the reinforcing member 12. Therefore, it is sufficient to uniformize the temperature in the direction of the transversal width, which is the direction of a side surface of the sheet-like heating body 113'. Sometimes, it is advantageous to provide a difference in temperature between the central portion and each of both end portions in the axial direction of the reinforcing member.

FIG. 10B illustrates an example of using the sheet-like heating body so that the heating temperature of the central portion of the reinforcing member 12 is high, and that the heating temperature is gradually lowered toward each of both end portions thereof. The temperature pattern illustrated in the figure can easily be realized by increasing the formation density of the heating element 123 at the central portion. However, usually, an amount of heat dissipated from each of both end portions is large. Thus, even in a case where the apparatus is formed so that the density of the heating element 123 is uniform, the heating temperature of the central portion is somewhat higher those of the end portions. The setting of the heating temperature of the central portion of the reinforcing member 12 in such a way as to be higher causes the reinforcing member 12 to start heat-shrinking from the central portion thereof. Then, the shrinking gradually makes progress toward each of both the end portions of the heat shrinkable tube. Further, the thermal melting tube provided therein starts melting from the central portion thereof and gradually extrudes the adhesive toward each of both end portions thereof. Thus, air bubbles become difficult to remain in the reinforcing member. Therefore, a lateral pressure applied by the bubbles to the optical fiber can be alleviated.

As illustrated in FIG. 10A, the apparatus is configured so that the heat equalizing plate 125' thermally separated from one another and divided into plural subplates in the axial direction of the reinforcing member 12 is bonded to the sheet-like heating body 113'. Thus, the sheet-like heating body 113' is heat-equalized in the direction of the side surface, in which the contact part and the noncontact parts of the reinforcing member are provided. However, a temperature difference can be provided in the axial direction thereof. Therefore, the sheet-like heating body can be prevented by using the heat equalizing plate from burning out. Simultaneously, a heat-treatment can be performed by using the temperature pattern illustrated in FIG. 10B.

Figure 11:
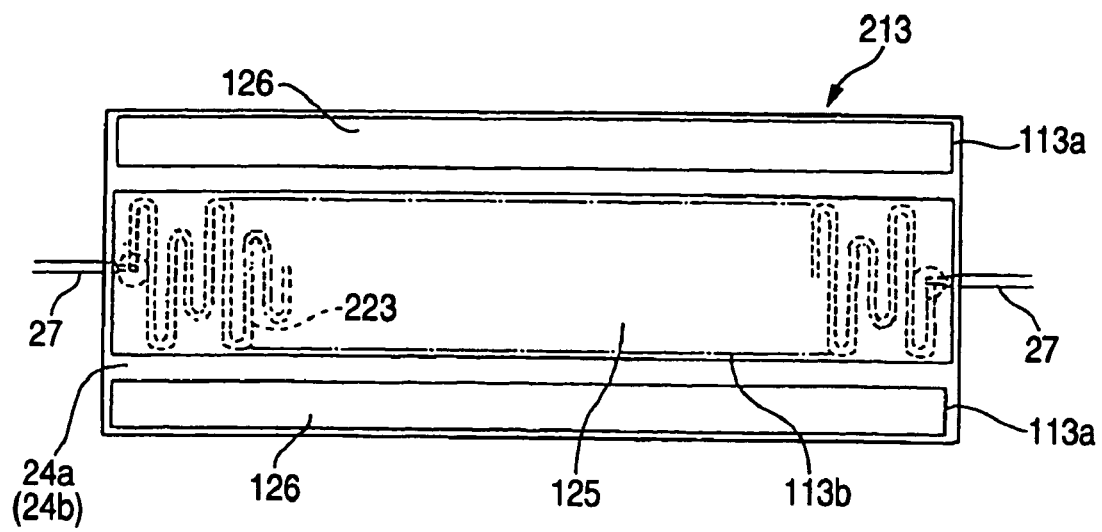
FIG. 11 is a view illustrating a still another concrete example of the sheet-like heating body according to the invention.
Figure 12:
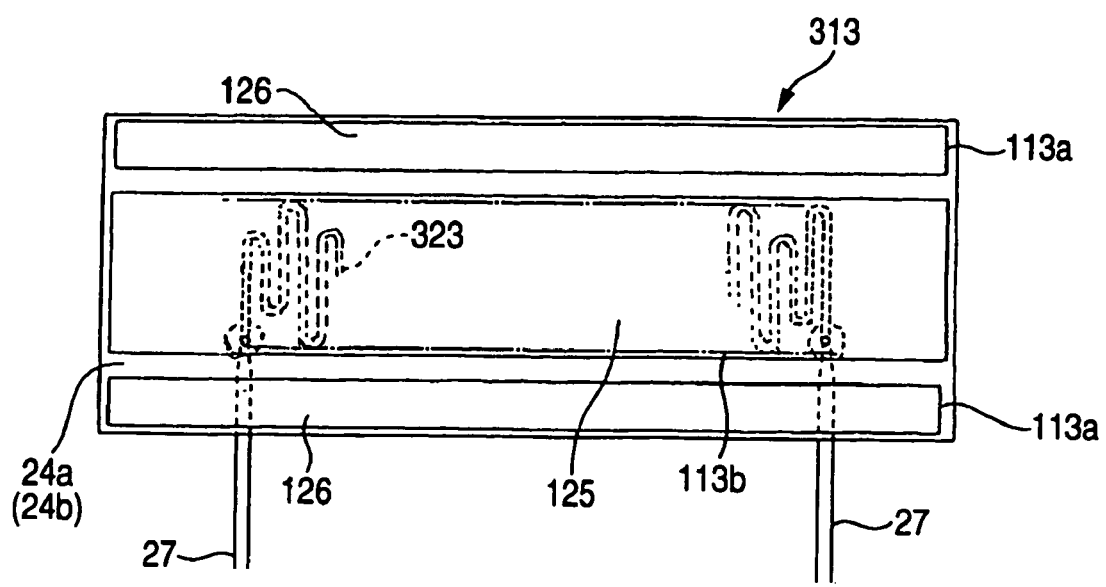
FIG. 12 is a view illustrating a yet another concrete example of the sheet-like heating body according to the invention.

FIGS. 11 and 12 show a still another example of the sheet-like heating body. As shown in FIGS. 11 and 12, the heating elements 223 and 323 of the sheet-like heating bodies 213 and 313 are zigzag-formed so that the density of the heating element at each of the side heating portions is coarse, as compared with that of the heating element at the central heating portion, similarly to the heating element 23 of the first embodiment shown in FIG. 4A. Thus, at the side heating portions associated with the side noncontact parts, the difference in temperature between the contact part and each of the noncontact parts can be decreased by reducing the amount of generated heat to thereby suppress the rise of the temperature. The combination of the sheet-like heating body and the heat equalizing plate 125 can further uniformize the temperature of the entire heating portion 113b. Thus, the sheet-like heating bodies 213 and 313 can be prevented from being damaged.

Further, as shown in FIG. 12, the heating element 323 of the sheet-like heating body 313 has a structure in which the axial length thereof is shorter than that of the heat equalizing plate 125. With this structure, the reinforcing member 12 starts heat-shrinking from the central portion thereof. The heat-shrinking of the heat shrinkable tube gradually makes progress toward each of both end portions thereof. Furthermore, the melting of the inner thermal melting tube similarly starts from the central portion thereof. The thermal melting tube gradually extrudes the adhesive toward each of both ends thereof. Furthermore, both end portions of the reinforcing member 12 does not heat-shrink before the central portion thereof does. Thus, the bubbles become difficult to remain in the reinforcing member. Furthermore, both end portions of the reinforcing member 12 does not heat-shrink before the central portion thereof does. Consequently, the bubbles can be prevented from remaining between the central portion and each of both end portions thereof. Thus, a lateral pressure, which is applied by the bubbles to the optical fiber, and so on can be alleviated.

Figure 13:
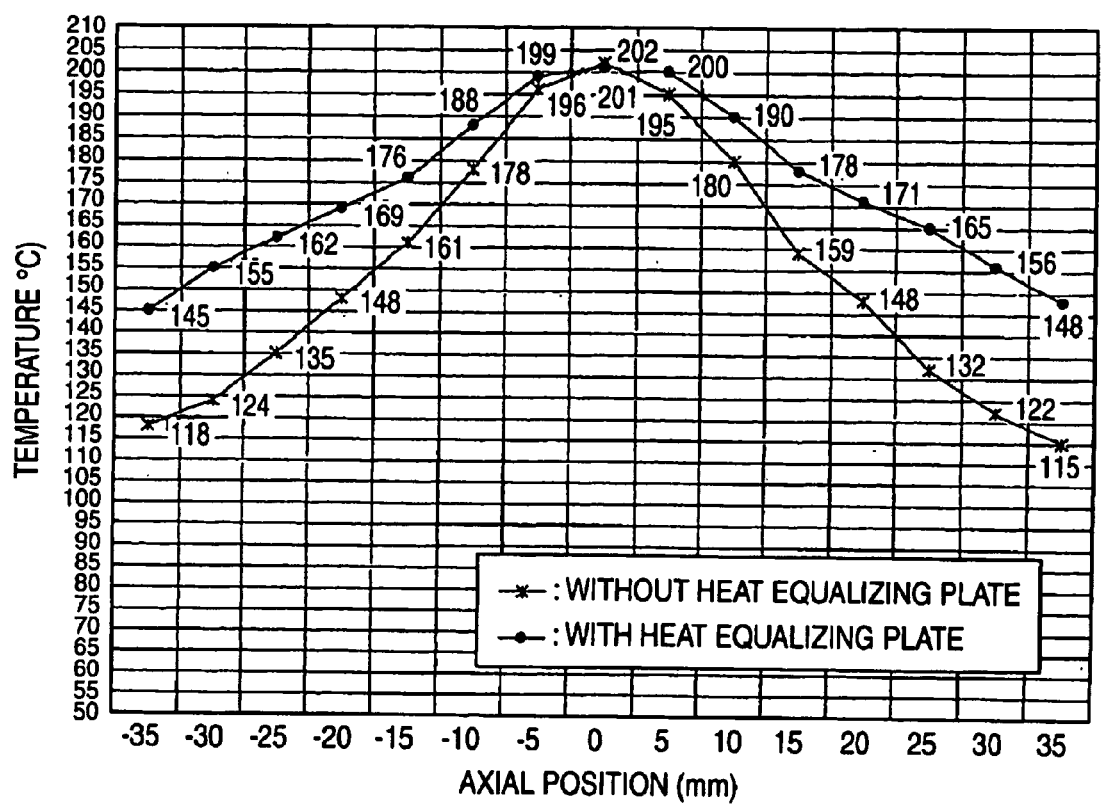
FIG. 13 is a graph illustrating the temperature distribution of the reinforcing member in the apparatus, which employs the sheet-like heating body shown in FIG. 12, in each of cases where the apparatus has a heat equalizing plate and where the apparatus has no heat equalizing plate.

FIG. 13 is a graph illustrating the temperature distribution of the heat-treatment apparatus, which uses the sheet-like heating body 313 shown in FIG. 12, in cases where the apparatus has the heat equalizing plate 125 and where the apparatus does not have the heat equalizing plate 125. Abscissas represent the axial positions in the reinforcing member 12 by setting the position of the axial center of the reinforcing member 12 at 0 mm. Ordinates represent the temperature of the reinforcing member 12 heated by the sheet-like heating body. As is seen from FIG. 13, in the case that the heat equalizing plate 125 is provided therein, the temperature of the reinforcing member 12 has high values at portions, whose axial position is other than 0 mm, especially at both end portions thereof, as compared with the case that the heat equalizing plate 125 is not provided therein. Further, the difference in temperature between the central portion and each of both end portions of the reinforcing member 12 is reduced. Therefore, in the case that the heat equalizing plate 125 is provided therein, the reinforcing member is heated uniformly at high temperature in the axial direction. The heat-shrinking in the axial direction of the reinforcing member is quickly achieved. This enables both end portions thereof to surely shrink.

Figure 14:
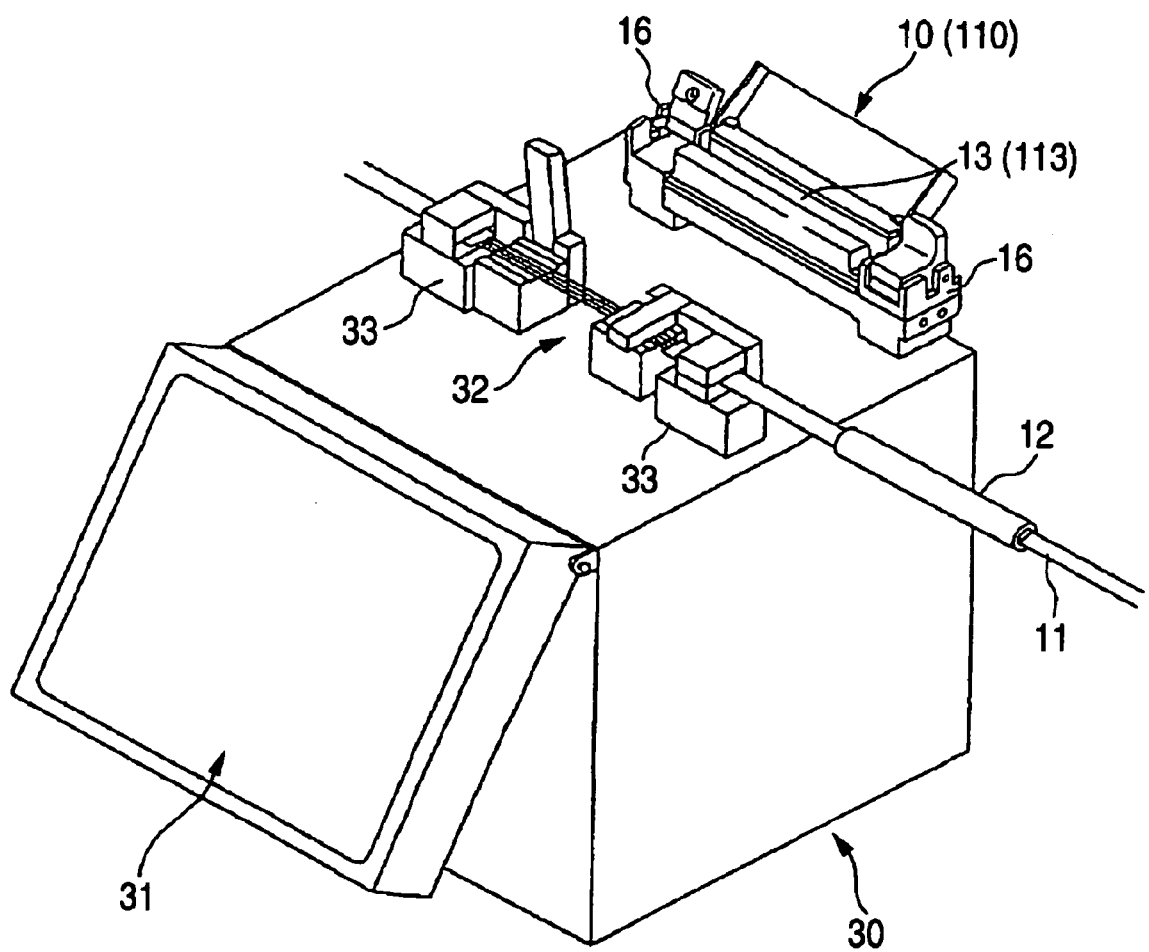
FIG. 14 is a view illustrating an example of the configuration in which the heat-treatment apparatus according to the invention is mounted on a fusion-splicing apparatus.

FIG. 14 is a view illustrating an example of the configuration in which the heat-treatment apparatus according to the invention is mounted in a fusion-splicing apparatus. The fusion-splicing apparatus 30 has a monitor apparatus 31, a fusion mechanism portion 32, and a clamp portion 33. The other reference characters used in FIGS. 1, 2, 6, and 7 are used for designating the other constituents. Thus, the description thereof is omitted herein. Devices of various configurations enabled to perform the fusion-splicing of single optical fibers or that of optical fiber ribbons by using arc-discharge or the like can be employed as the fusion mechanism portion 32 (the description of the detail structure thereof is omitted herein). According to the invention, the aforementioned heat-treatment apparatus 10 or 110 is installed inparallel with the fusion mechanism portion 32 of this fusion-splicing apparatus 30. Consequently, the workability of the apparatus can be improved.

When the single optical fibers or optical fiber ribbons 11 are installed in the fusion mechanism portion 32, one of the optical fibers 11 is preliminarily passed through the reinforcing member 12. The optical fibers 11 are held and aligned by the clamp portion 33. Further, alignment of the connecting ends of the optical fibers is performed by an aligning means (not shown). Then, the fusion-splicing of the optical fibers is performed. The treatment states of the fusion-splicing of the optical fibers are sequentially displayed by the monitor apparatus 31. Subsequently, the optical fibers 11 are detached form the clamp portion 33. Then, the reinforcing member 12 is moved to the fusion-splicing portion. Subsequently, during such a state is maintained, the reinforcing member 12 is accommodated and placed in the U-shaped sheet-like heating body 13 or 113 in the heat-treatment apparatus 10 or 110, which is installed adjacently thereto. The optical fibers 11 are grasped and fixed by the clamp supports 16 provided on both sides thereof. Then, a heat-treatment is performed by performing a predetermined control operation.

Although the invention have been described in detail by referring to particular embodiments, it is apparent to those skilled in the art that various alterations and modifications may be possible without departing from the spirit and the scope of the invention.

The present application is based on the Japanese Patent Application (No. 2003-381900) filed on Nov. 12, 2003 and the Japanese Patent Application (No. 2003-383623) filed on Nov. 13, 2003, the entire content of which is incorporated by reference herein.

What is claimed is:

1. A heat-treating apparatus of an optical fiber reinforcing member for heat-shrinking the optical fiber reinforcing member, which protects a fusion-splicing portion between optical fibers, comprising:
   a sheet-like heating body, bent like a letter "U" and having a central portion and side portions, for heating said optical fiber reinforcing member; and
   a heat equalizing plate constituted by a metal plate bonded to a heating portion of said sheet-like heating body;
   wherein a power density of the side portions is set to be less than or equal to 80% of a power density of the central portion.

2. The heat-treating apparatus of optical fiber reinforcing member according to claim 1, wherein said heat equalizing plate is bonded to an inner surface of said sheet-like heating body bent like a letter "U".

3. The heat-treating apparatus of optical fiber reinforcing member according to claim 1, wherein a fluorocarbon resin is coated on a surface of said heat equalizing plate.

4. The heat-treating apparatus of optical fiber reinforcing member according to claim 1, wherein said heat equalizing plate is constituted by plural equalizing subplates thermally separated in an axial direction of said reinforcing member.

5. The heat-treating apparatus of optical fiber reinforcing member according to claim 1, wherein a heating temperature of each of the side portions is set to be lower than a heating temperature of a central portion.

6. The heat-treating apparatus of optical fiber reinforcing member according to claim 1, wherein a heating element of said sheet-like heating body is zigzag-formed so that a density of a heating element of each of said side portions is coarse as compared with a density of a heating element of said central portion.

7. An optical fiber fusion-splicing apparatus, wherein said optical-fiber-reinforcing-member heat-treating apparatus according to claim is mounted therein.

8. An optical-fiber-reinforcing-member heat-treating method for heat-shrinking an optical fiber reinforcing member, which protects a fusion-splicing portion between optical fibers; wherein said optical fiber reinforcing member is accommodated and placed in a sheet-like heating body bent like a letter "U", having a central portion and side portions, and having a heating portion, wherein a power density of the side portions is set to be less than or equal to 80% of a power density of the central portion, to which a heat equalizing plate constituted by a metal plate is bonded; and then heat-shrunk.

9. An optical-fiber-reinforcing-member heat-treating method for heat-shrinking an optical fiber reinforcing member, which protects a fusion-splicing portion between optical fibers, including the steps of setting a heating temperature of each of the side portions of a heating portion of a U-shaped sheet-like heating body to be lower than a heating temperature of a central portion thereof, and setting a power density of each of the side portions to be less than or equal to 80% of a power density of the central portion.

* * * * *